United States Patent [19]
von Wilmowsky

[11] Patent Number: 5,709,357
[45] Date of Patent: Jan. 20, 1998

[54] TILTROTOR HELICOPTER

[76] Inventor: Kaspar Freiherr von Wilmowsky, Adalbertstrasse 47, D-80799 Munich, Germany

[21] Appl. No.: 497,051

[22] Filed: Jun. 30, 1995

[30] Foreign Application Priority Data

Jun. 30, 1994 [DE] Germany .................. 44 22 987.9

[51] Int. Cl.$^6$ .................................................. B64C 29/00
[52] U.S. Cl. .................. 244/7 R; 244/17.23; 244/56; 244/66
[58] Field of Search ..................... 244/7 R, 17.23, 244/56, 66, 6

[56] References Cited

U.S. PATENT DOCUMENTS

| | | |
|---|---|---|
| 1,414,241 | 4/1922 | Wells . |
| 2,702,168 | 2/1955 | Platt ........................ 244/7 R |
| 3,089,666 | 5/1963 | Quenzler ................ 244/7 R |
| 3,405,890 | 10/1968 | Eickmann . |
| 3,528,630 | 9/1970 | Ferris et al. ........... 244/7 R |
| 4,504,029 | 3/1985 | Eickmann . |

FOREIGN PATENT DOCUMENTS

| | | |
|---|---|---|
| 2816382 | 2/1980 | Germany . |
| 354519 | 11/1937 | Italy ........................ 244/7 R |
| 383784 | 1/1965 | Switzerland ........... 244/7 R |
| WO9105704 | 5/1991 | WIPO . |

*Primary Examiner*—Galen L. Barefoot
*Attorney, Agent, or Firm*—Birch, Stewart, Kolasch & Birch, LLP

[57] ABSTRACT

The invention relates to a tiltrotor helicopter comprising a fuselage (1), a wing arrangement (2) and at least one power plant (5), and including two contrarotating, cyclically controllable rotors (7, 8) which are spaced from one another in the longitudinal direction of the fuselage and arranged substantially on a longitudinal axis of the fuselage (1) as well as being respectively tiltable out of a first tilted position for helicopter flight into a second tilted position for airplane flight, the first rotor (7) being arranged at the front end of the fuselage (1) and substantially above the same and the second rotor (8) being arranged at the rear end of the fuselage (1) and substantially beneath the same, and the first rotor (7) being tiltable about a tilting axis (17) extending substantially perpendicularly to the longitudinal axis of the fuselage (1) out of the first tilted position downwardly and in front of the fuselage (1) into the second tilting position and the second rotor (8) being tiltable about a tilting axis (18) extending substantially perpendicularly to the longitudinal axis of the fuselage (1) out of the first tilted position upwardly and behind the fuselage (1) into the second tilted position.

12 Claims, 8 Drawing Sheets

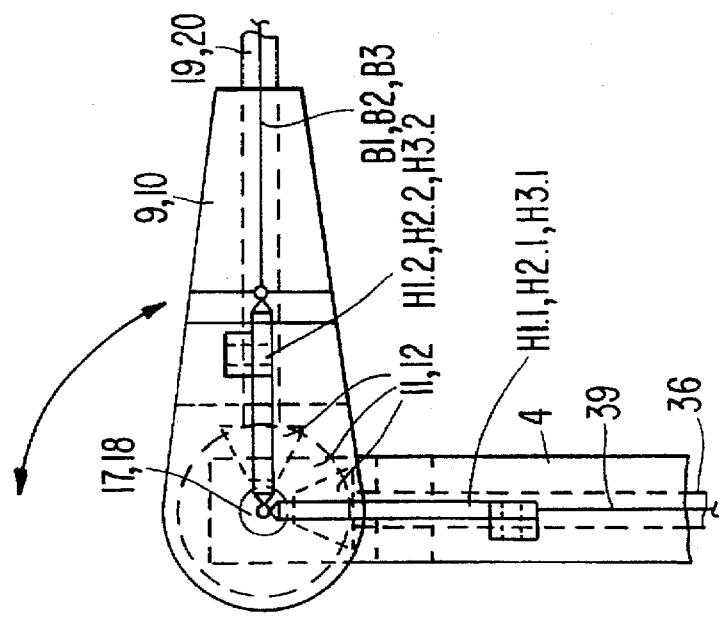
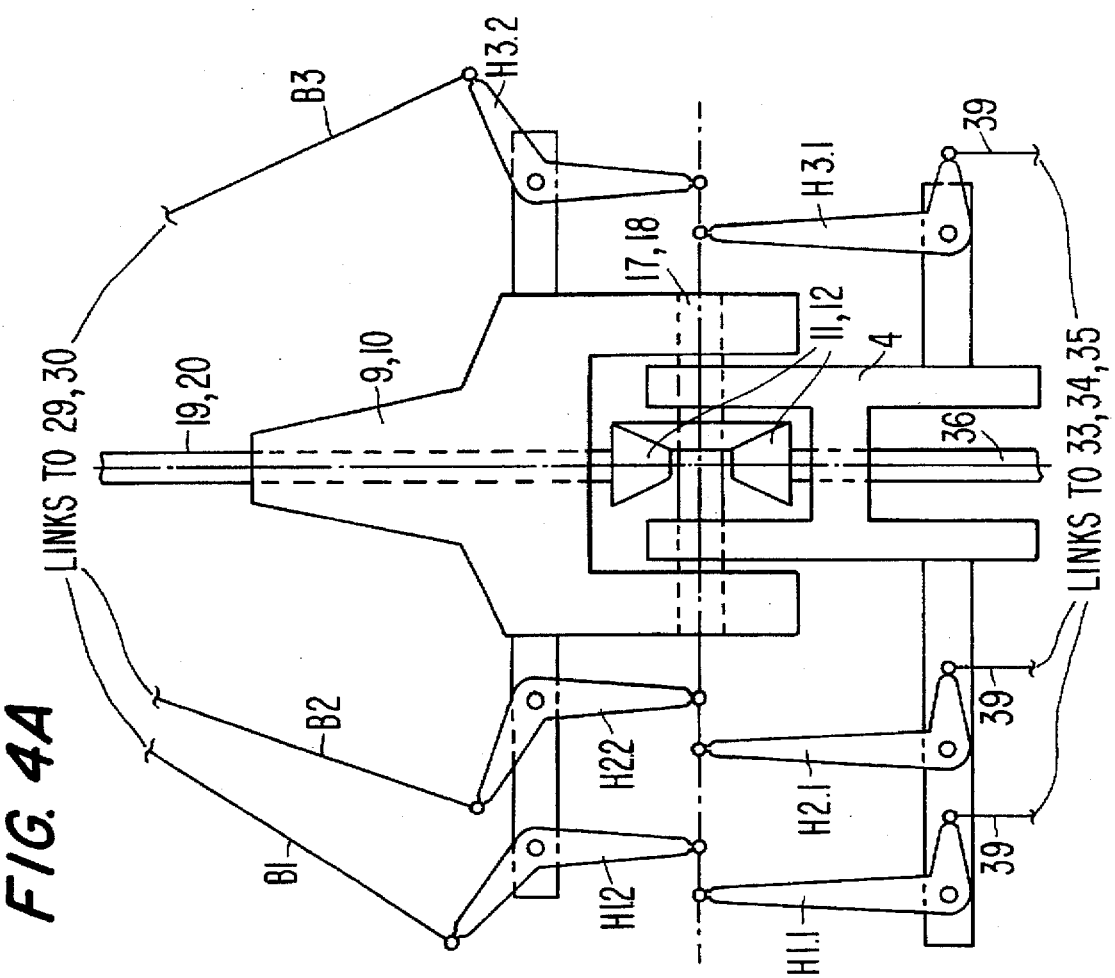

TILTROTOR HELICOPTER

The invention relates to a tiltrotor helicopter.

BACKGROUND OF THE INVENTION

An aircraft is known from U.S. Pat. No. 1,414,241 to include a fuselage, a wing arrangement and a power plant comprising two propellers spaced from each other in the longitudinal direction of the fuselage and arranged substantially on a longitudinal axis of the fuselage as well as being respectively tiltable out of a first tilted position into a second tilted position, the first propeller being arranged at the front end of the fuselage and the second propeller. The rear end of the fuselage and the first propeller is tiltable out of the first tilted position upwardly and over the fuselage into the second tilted position about a tilting axis extending substantially perpendicularly to the longitudinal axis of the fuselage and the second propeller is tiltable out of the first tilted position downwardly and under the fuselage into the second tilted position about a tilting axis extending substantially perpendicularly to the longitudinal axis of the fuselage. In this manner, the take-off path of the aircraft is to be shortened or a vertical take-off is made possible.

An aircraft driven by an hydraulic motor and comprising a plurality of propellers is also known from U.S. Pat. No. 4,504,029. One embodiment comprises a fuselage and at least one power plant as well as two propellers spaced from one another in the longitudinal direction of the fuselage and respectively tiltable out of a first tilted position for hovering or vertical flight into a second tilted position for flight with a flying speed >0. The first propeller is arranged at the forward end of the fuselage and substantially above this and the second propeller is arranged at the rear end of the fuselage and substantially beneath this. The first propeller is tiltable about a tilting axis extending substantially perpendicularly to the longitudinal axis of the fuselage out of the first tilted position forwardly into a propeller plane inclined with respect to the horizontal into the second tilted. The second propeller is tiltable about a tilting axis extending substantially perpendicular to the longitudinal axis of the fuselage out of the first tilted position rearwardly into a propeller plane inclined with respect to the horizontal into the second tilted position. An aircraft which takes off vertically or along a very short take-off path is to be realized by means of this embodiment, the propellers having to be always inclined with respect to the horizontal in terms of their propeller plane for horizontal flight in order to achieve a vertical lift component.

SUMMARY OF THE INVENTION

The present invention is based on the object of providing a simple and effective tiltrotor helicopter which is suited both for helicopter flight as well as quick aircraft flight and which should be particularly simply and safely controllable in the very critical transition phase between helicopter flight and airplane flight.

This object is solved by a tiltrotor helicopter discussed hereinbelow. Additionally, the object mentioned above is solved by a method of controlling a tiltrotor helicopter including the features of claim 11.

The tiltrotor helicopter according to the invention is capable in helicopter flight of flying, of taking off, of landing and of hovering vertically, and of moving forwards in quick airplane flight with the appropriate tilted position of the rotors, it being possible to considerably exceed the flying speed usually limited in the case of helicopters on account of the maximum achievable rate of progression. On account of the inventive arrangement and tiltability of the cyclically controllable rotors as well as the inventive manner of controlling the rotors, a very stable, easily controllable flying behavior is achieved in particular in the very critical transition phase from helicopter flight to airplane flight and vice versa. On account of the lift distribution of the rotors which is capable of being realized by the cyclical blade adjustment, the tilting of the rotors can also be actively enhanced, on account of which, in turn, the weight of the rotor tilting mechanism is capable of being considerably reduced. This has a very positive effect on the structural weight and the achievable payload of the inventive tiltrotor helicopter.

It is also possible on account of the cyclical controllability of the rotors, which is also maintained in airplane flight, to actively enhance the aerodynamic control of the tiltrotor helicopter in airplane flight, which considerably increases both the manoeuvrability and the stability.

Further advantageous embodiments of the inventive tiltrotor helicopter are set forth hereinbelow.

BRIEF DESCRIPTION OF THE DRAWINGS

An exemplary embodiment of the inventive tiltrotor helicopter is described with reference to further design features and advantages in the following with reference to the drawings, in which:

FIGS. 4A and 4B show a link means to the swash plate of a respective rotor of the inventive tiltrotor helicopter in a schematic side view and top plan view, respectively

DETAILED DESCRIPTION OF THE INVENTION

Figure 1:
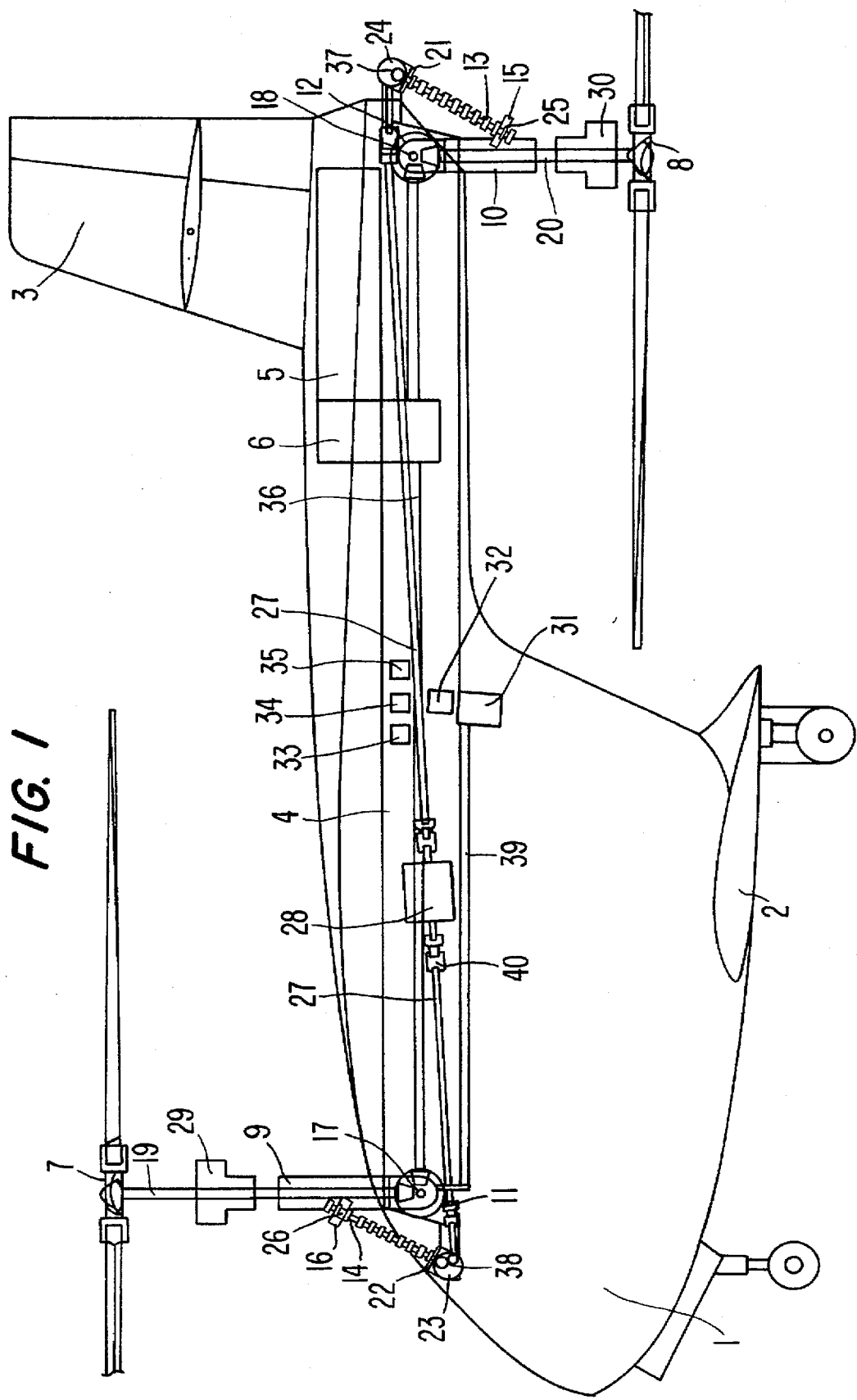
FIG. 1 shows a schematic side view of the inventive tiltrotor helicopter.

A schematic side view of the inventive tiltrotor helicopter can be seen in FIG. 1. The helicopter includes a fuselage 1, a wing arrangement 2, a tail surface arrangement with a rudder tail surface 3.1 and a horizontal tail surface 3.2, two contrarotating, cyclically controllable rotors 7, 8 spaced from one another in the longitudinal direction of the fuselage 1 and arranged essentially on a longitudinal axis of the fuselage 1 as well as respectively being tiltable out of a first tilted position for helicopter flight into a second tilted position for airplane flight, the first rotor 7 being arranged at the forward end of the fuselage 1 and substantially above the same and the second rotor 8 being arranged at the rear end of the fuselage 1 and substantially beneath the same, and the first rotor 7 being tiltable about a tilting axis 17 extending substantially perpendicularly to the longitudinal axis of the fuselage 1 out of the first tilted position downwardly and in front of the fuselage 1 into the second tilted position and the second rotor 8 being tiltable about a tilting axis 18 extending essentially perpendicularly to the longitudinal axis of the fuselage 1 out of the first tilted position upwardly and behind the fuselage 1 into the second tilted position, and a power plant 5 to drive the rotors 7, 8.

The fuselage consists of a cabin, not shown in detail, and a wing mounting for the wing 2 arranged at the bottom of the fuselage 1. The wing 2 has a transverse rudder and can additionally be provided with flaps which reduce the air resistance in helicopter flight.

The fuselage 1 is provided with a support 4 for rotor mountings 9, 10 and the drive unit 5. According to one embodiment of the inventive tiltrotor helicopter, the fuselage 1 itself can also be designed as the longitudinal support 4.

As may be easily recognized in FIG. 1, the fuselage 1 has an extremely high tail extension in which the power plant 5 is arranged. According to the kind of use, one or more power plants 5 can be used. The afore-mentioned arrangement serves to optimize the position of the center of gravity of the tiltrotor helicopter and the background noise in the cabin.

The fuselage 1 also includes tank containers not shown in more detail in the drawings which are mounted at suitable locations in the fuselage of the tiltrotor helicopter, for example above or to the side of the support 4, in the rear part of the cabin, in the wing 2 or in the tail surfaces 3.1, 3.2.

FIG. 1 shows the tiltrotor helicopter in a rotor tilted position intended for helicopter flight, the forward rotor 7 being tilted over the fuselage 1 and the rear rotor 8 beneath this.

The drive unit of the tiltrotor helicopter includes the power plant 5, a transmission 6, a rotor drive shaft 36 which produces a mechanical connection between both rotors 7, 8, and two bevel wheel gears 11, 12 adapted to the rotor drive shaft 36, respectively one bevel wheel gear for the forward rotor 7 and one bevel wheel gear for the rear rotor 8. These bevel wheel gears 11, 12 ensure that the rotors 7, 8 can be driven in every desirable rotor tilted position. The rotor 7, 8 contrarotate in order to advantageously compensate the rotor forces acting on the entire system of the tiltrotor helicopter.

Figure 2:
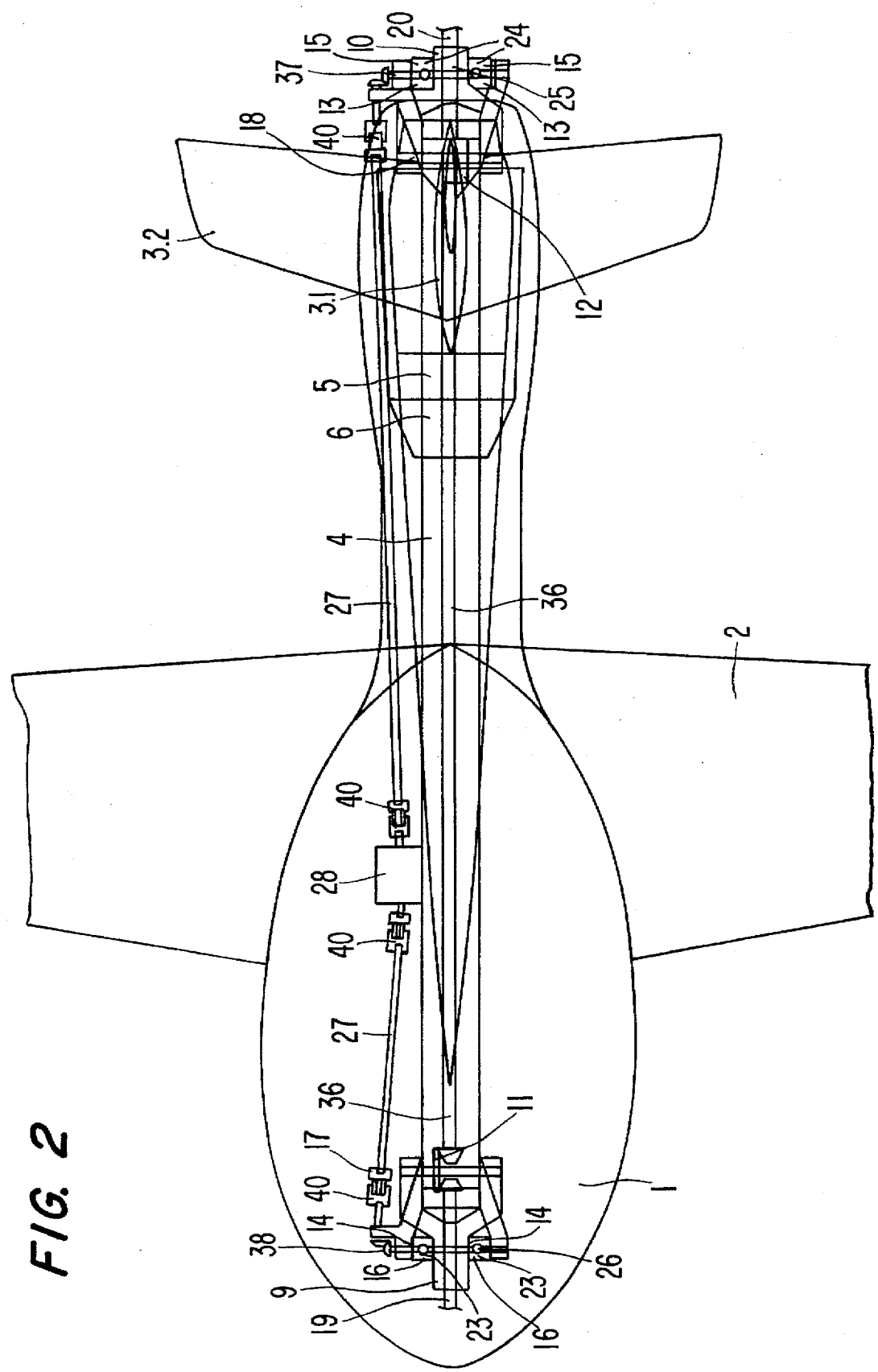
FIG. 2 shows a schematic top plan view of the inventive tiltrotor helicopter.

FIG. 2 shows the inventive tiltrotor helicopter in a schematic top plan view, the rotors being in a position suitable for airplane flight, i.e. the forward rotor 7 is tilted in front of and the rear rotor 8 behind the fuselage 1. As can be seen in the drawing, the rotor shafts 19, 20 of both rotors are supported in fork-shaped rotor mountings 9, 10 and connected with the bevel wheel gears 11 and 12, respectively. In this manner, tilting of the rotating rotor 7, 8 about the tilting axes 17, 18 is made possible.

Figure 3A:
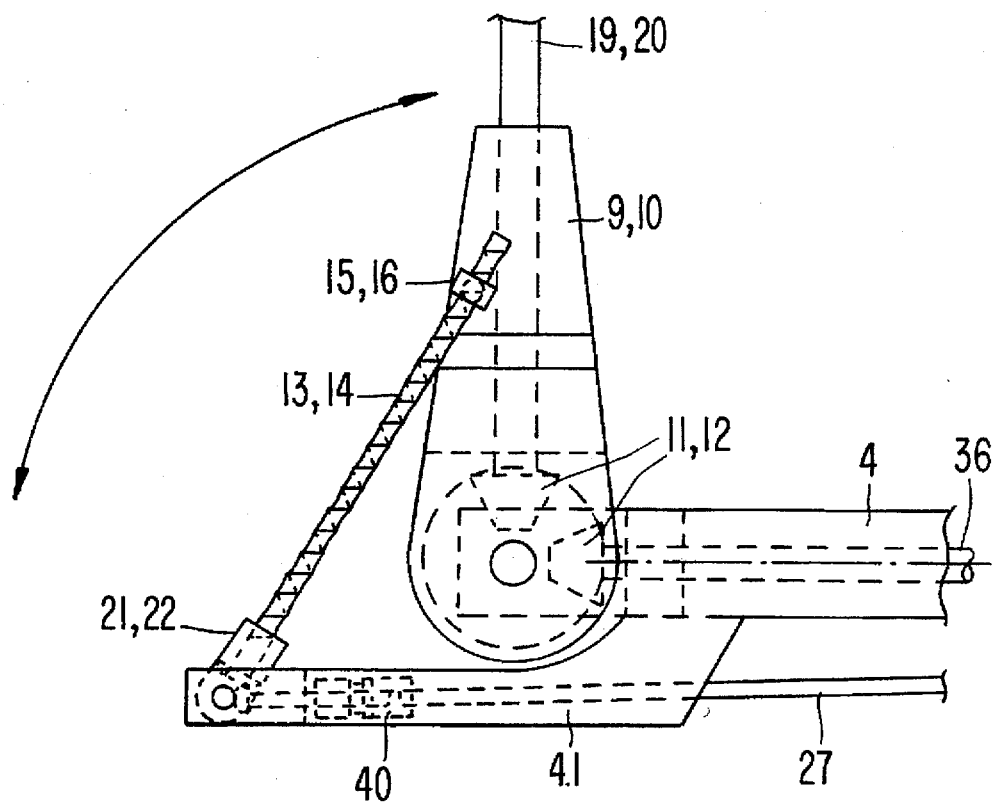
FIGS. 3A and 3B show an inventive rotor tilting mechanism in a schematic top plan view respectively and side view.
Figure 3B:
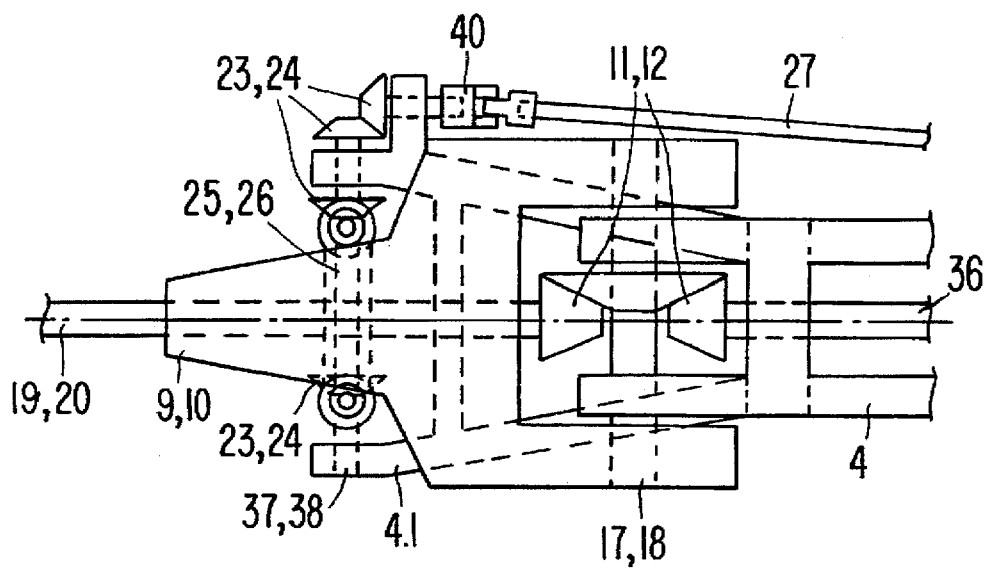

As can be seen in FIGS. 3A and 3B, which illustrates the tilting mechanism of the inventive tiltrotor helicopter in side view and top plane view, respectively, the fork-shaped rotor mounting 9, 10 of a respective rotor 7, 8 is connected by means of respective axes 17, 18, with a respective end of the longitudinal support 4. The tilting mechanism of a respective rotor also respectively includes two driven threaded rods 13, 14 which, in the shape of a triple link, are connected in a hinged manner at one end with the rotor mounting 9, 10 and at the other end with a fork-shaped extension arm 4.1 of the longitudinal support 4. The ends of the respectively two threaded rods 13, 14 associated with the rotor mounting 9, 10 are supported in threaded bushes 15, 16 and the ends associated with the extension arm 4.1 in mountings 21, 22 which are arranged to be pivotable about an axis 37, 38. As can also be seen in FIG. 3A, the threaded rod arrangement additionally includes a bevel wheel gear 23, 24 with axes 25, 26 which are driven via drive shafts 27. As indicated in FIG. 1, the power transmission to the drive shaft 27 of the tilting mechanism ensues via an electric motor 28 arranged in the fuselage 1. A drive shaft 27 is connected at its respective ends facing the electric motor 28 and the bevel wheel gear 23, 24 of the tilting mechanism via a suitable link 40 with the bevel wheel gear 23, 24 and the electric motor 28. Depending on the drive direction of the shaft 27, both rotors 7, 8 are tilted synchronously in the above described manner by means of the bevel wheel gears 23, 24 and the threaded rods 13, 14, the tilting movement ensuing about the tilting axes 17, 18. The tilting direction is indicated by way of example with respect to the forward rotor 7 by a double arrow in FIGS. 3A and 4B.

A rotor control which supports the tilting of the rotor 7, 8 can be carried out simultaneously with the actuation of the tilting mechanism. During the transition phase from helicopter flight to airplane flight or vice versa, in which the forward rotor 7 is tilted about the tilting axis 17 downwardly out of its position above the fuselage 1 and in front of the fuselage and the rear rotor 8 is tilted upwardly out of its position beneath the fuselage and behind the fuselage, the swash plate 41 of a respective rotor is driven in such a manner with the aid of the cyclical blade adjustment that the rotors automatically support the tilting movement of the rotors in the corresponding direction on account of their changed lift distribution.

In order to ensure the control of the rotor 7, 8, which ensues as described above by means of a suitable driving of the swash plate 41 of the respective rotor, even during the tilting movement in the transition phase, as shown in FIG. 4B, there is provided for each rotor 7, 8 a link means to the swash plate 41 of a rotor which is pivotable about the respective rotor tilting axis 17, 18 and controllable independently of the respective rotor tilted position. This link means incorporates three lever pairs H1.1, H1.2; H2.1, H2.2; H3.1, H3.2, which are respectively associated with one rotor 7, 8 and connected in a hinged manner with each other by means of an intermediate part, wherein respectively one portion of the lever pairs, namely the levers H1.1, H2.1, H3.1, is arranged on the side of the longitudinal support 4 and the other portion of the lever pairs, namely the levers H1.2, H2.2, H3.2, is arranged on the rotor mounting 9, 10 of a respective rotor. Swash plate control rods P1, P2, P3 adjoin levers H1.1, H2.2, H3.1 associated with the respective rotor mounting 9, 10 and lead to the swash plate linking apparatus 29, 30 of the swash plate 41 located on the rotor mast and not illustrated in FIG. 4A. As can be easily recognized in FIG. 4A, the hinged connection locations between the levers H1.1, H2.1, H3.1 and H1.2, H2.2, H3.2 are arranged exactly on the tilting axis 17, 18 of the tilting mechanism of a respective rotor 7, 8 so that a link to the respective swash plate 41 or its swash plate linking apparatus 29, 30 is guaranteed in each rotor tilted position independently of this position.

Control members such as rods, tension cables or Bowden cables which serve to link and actuate various structural components of the linking and control means of the tiltrotor helicopter are generally denoted in the Figures with the reference sign 39.

Figure 5A:
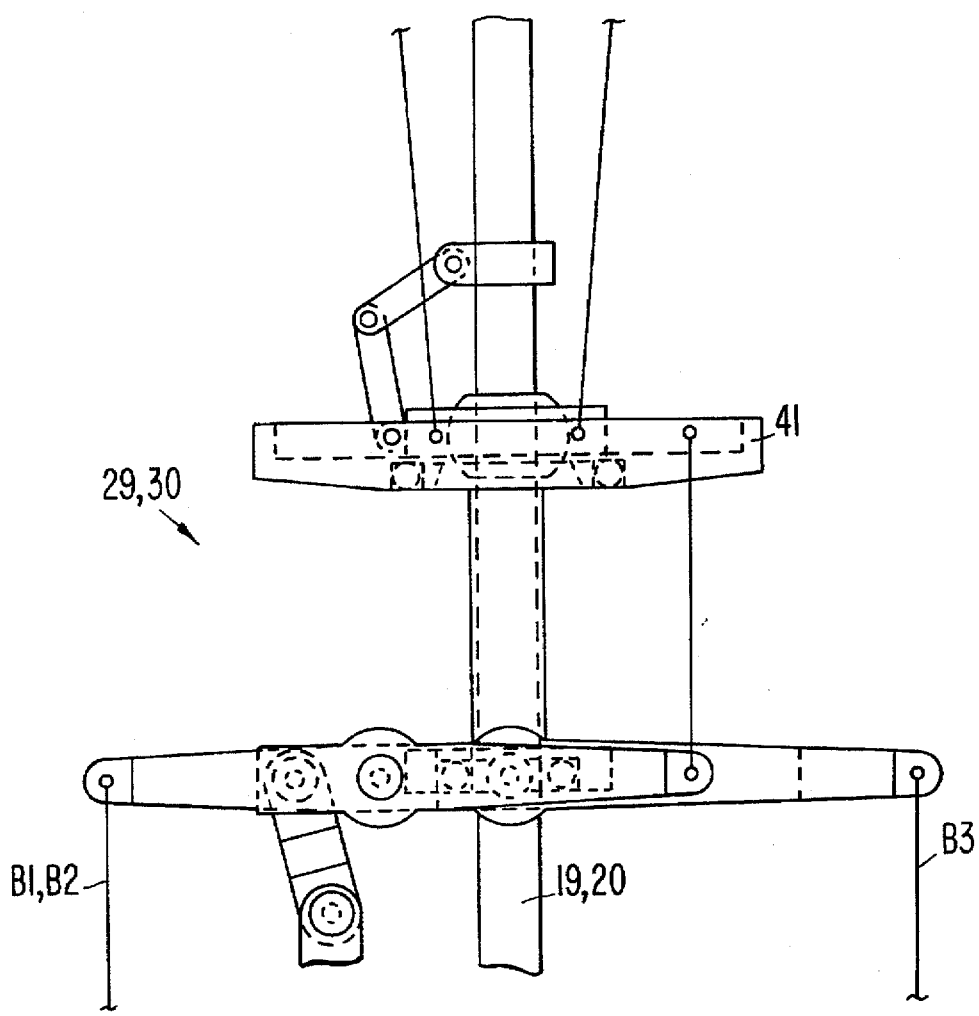
FIGS. 5A and 5B show a swash plate linking apparatus of a rotor in a schematic side view and top plan view, respectively
Figure 5B:
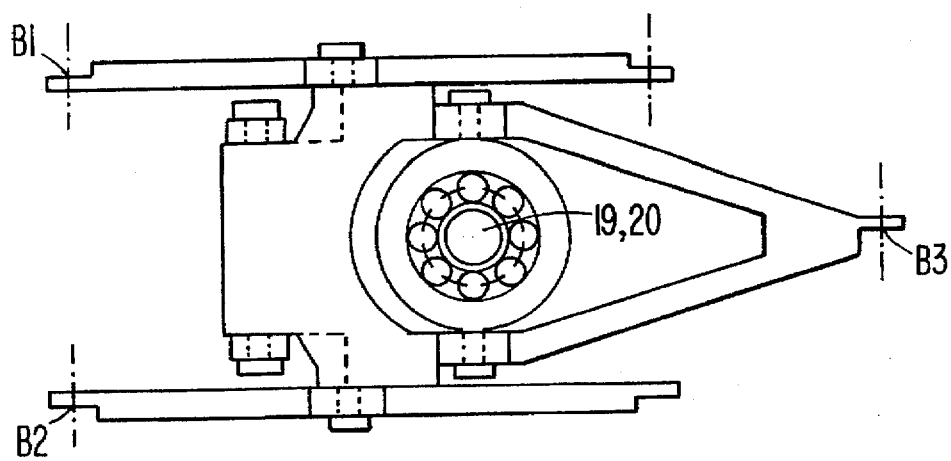

The swash plate linking apparatus 29, 30 of the swash plate 41 of a respective rotor 7, 8 is shown in more detail in FIGS. 5A and 5B in a schematic side view, respectively and top plan view. The swash plate control rods B1 to B3 extending from the levers H1.2, H2.2 and H3.2 of FIG. 4A can also be seen clearly in these Figures. It is clear from the illustration in FIG. 5A that the control rod B3 serves for the collective control and the control rods B1 and B2 serve for the cyclical control of the swash plate 41 and the rotor blades of the rotor. Thus, there are three control possibilities available for each rotor 7,8, namely a collective blade adjustment and, by means of cyclical blade adjustment, pitch and roll, for which only the three afore-mentioned links are required.

Figure 6B:
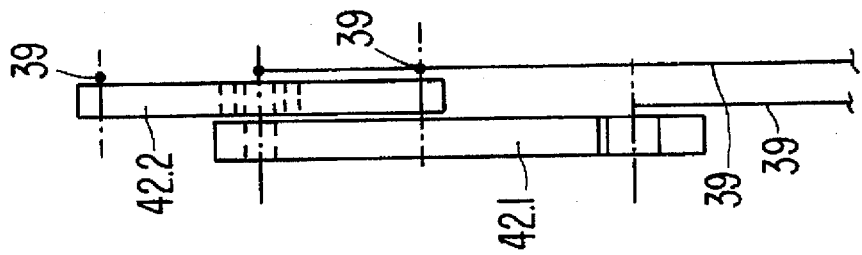
FIGS. 6A and 6B show a schematic top plan view and a schematic side view, respectively, of a control means of the inventive tiltrotor helicopter.
Figure 6A:
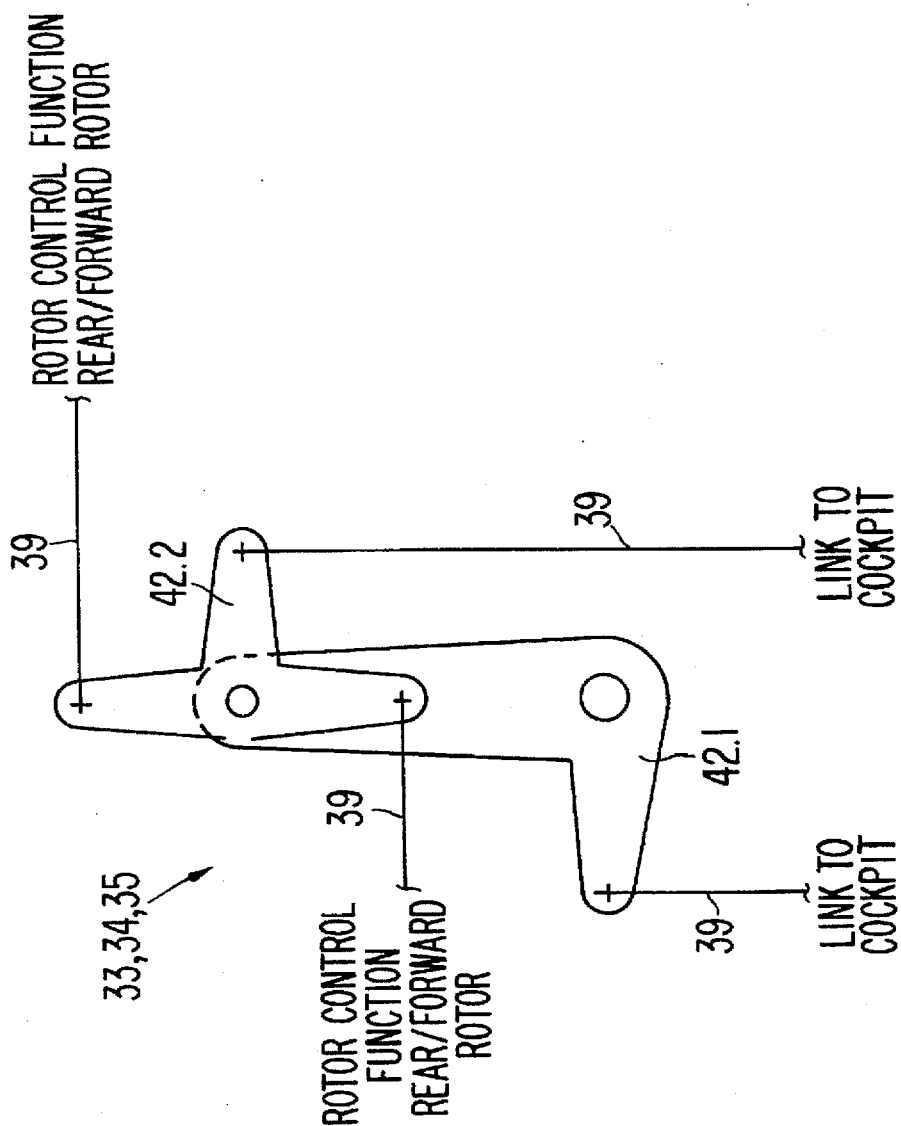

For controlling the rotor, the inventive tiltrotor helicopter comprises three respectively similar control means 33, 34, 35 with mechanical control elements. These control means connect the control functions of both rotors 7, 8 via a lever arrangement shown in a schematic top plan view and a schematic side view in FIGS. 6A and 6B, respectively, the lever arrangement comprising an L-lever 42.1 which coacts with a T-shaped lever 42.2. By means of this lever arrangement, the pitch function of the forward rotor is combined with the pitch function of the rear rotor, the roll function of the forward rotor is combined with the roll function of the rear rotor, and the collective blade adjustment function of the forward rotor is combined with the collective blade adjustment function of the rear rotor.

On account of this, six rotor control functions result which are designated with S1 to S6 as follows:

| | Rotor control function |
|---|---|
| S1 | collective blade adjustment of the forward rotor opposite the collective blade adjustment of the rear rotor |
| S2 | collective blade adjustment of the forward rotor in the same sense as the collective blade adjustment of the rear rotor |
| S3 | roll movement of the forward rotor opposite the roll movement of the rear rotor |
| S4 | roll movement of the forward rotor in the same sense as the roll movement of the rear rotor |
| S5 | pitch movement of the forward rotor opposite the pitch movement of the rear rotor |
| S6 | pitch movement of the forward rotor in the same sense as the pitch movement of the rear rotor |

These functions S1–S6 of the rotor control are transferred to the control functions of the tiltrotor helicopter as follows:

| Function of the tiltrotor helicopter | Function of the rotor control in helicopter flight | Function of the rotor control in the transition phase | Function of the rotor control in airplane flight |
|---|---|---|---|
| Collective blade adjustment | S2 | S2 | S2 |
| Yaw | S3 | S3 | S3 |
| Roll | S4 | S4 | S4 |
| Pitch | S1 | S1 and S5 | S5 |
| Special function | — | S6 | — |

Figure 7B:
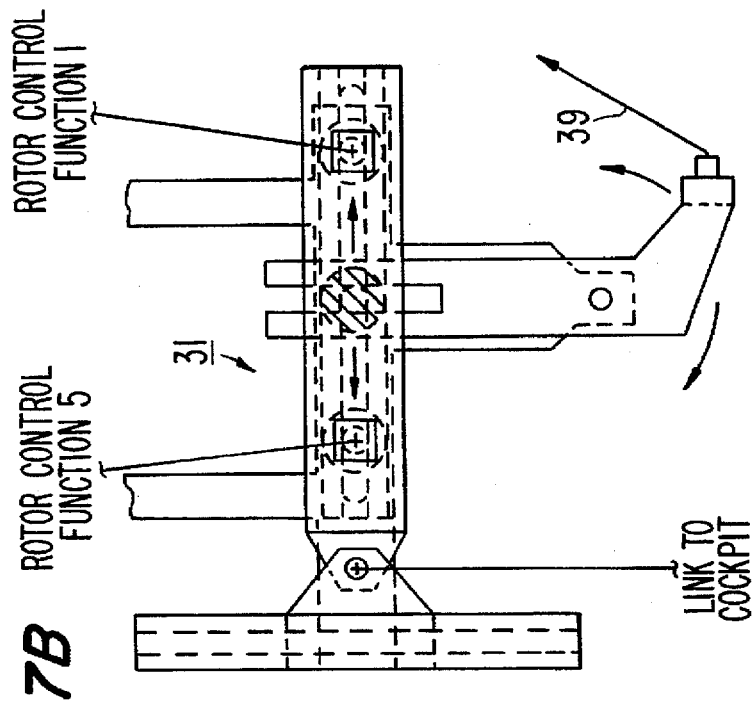
FIGS. 7A, 7B and 7C show schematically three views of a mixer of the control means of the inventive tiltrotor helicopter.
Figure 7A:
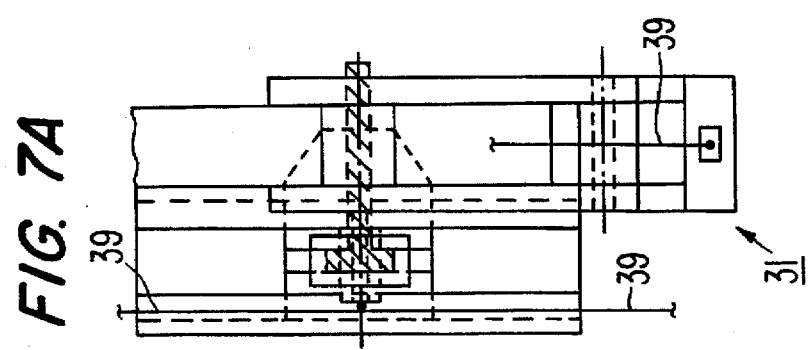
Figure 7C:
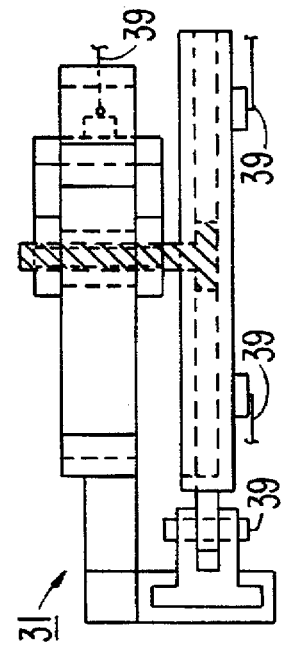

The pitch function of the tiltrotor helicopter requires a mixing of function S1 with function S5 of the rotor control. This is achieved by means of a mechanical mixer 31 as is illustrated schematically in three views of FIGS. 7A, 7B and 7C.

Figure 8A:
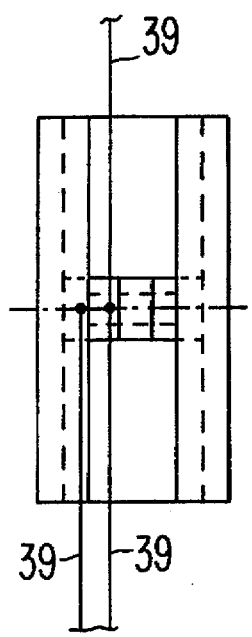
FIGS. 8A, 8B and 8C show schematically three views a schematic illustration in several viewing of trimming of the control means.
Figure 8B:
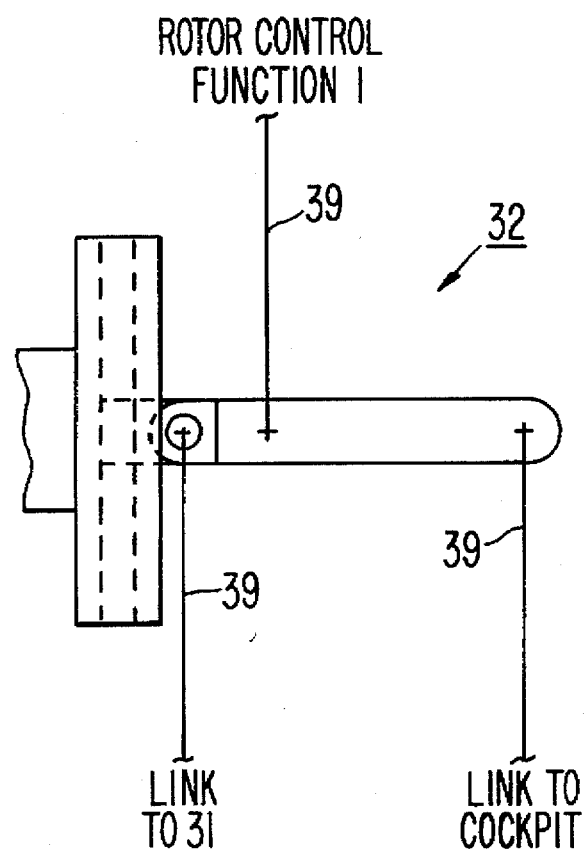
Figure 8C:
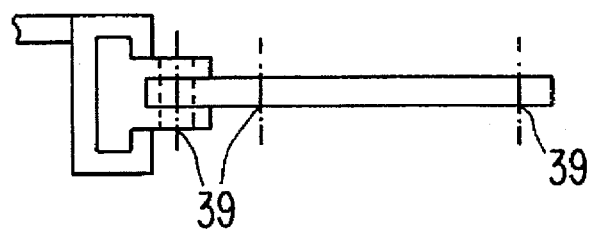

In order to be able to separately control the rotor control function S1 in airplane flight which is turned off by the mixer 31 in airplane flight, a separate trimming 32 (see also FIG. 1) is provided between the mixer 31 and the control means 33, 34 or 35 which makes it possible to trim the rotor control function S1 in airplane flight and, if necessary, also in helicopter flight. The trimming is shown in detail in FIG. 8A, 8B and 8C.

The mixer 31 is also linked via mechanical control elements 39 by one of the two rotor mountings 9, 10 so that the mixer is operated upon tilting of the rotor 7, 8.

The control surfaces of the wing 2 and the tail surfaces are connected by means of mechanical control elements 39 with the rotor control: the horizontal rudder of the horizontal tail surface 3.1 with the pitch function of the rotor 7, 8, the rudder control surface of the rudder tail surface 3.2 with the yaw function of the rotor 7, 8, and the transverse rudder of the wing 2 with the roll function of the rotor 7, 8.

The control functions of the tiltrotor helicopter can, for example, be amplified by means of power amplifiers such as hydraulic actuators arranged in the rear section of the cabin.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A tiltrotor helicopter comprising:
a fuselage,
a wing arrangement and
at least one power plant, and
first and second contrarotating, cyclically controllable rotors which are spaced from one another in the longitudinal direction of the fuselage and substantially arranged on a longitudinal axis of the fuselage as well as being respectively tiltable out of a first tilted position for helicopter flight into a second tilted position for airplane flight, wherein
said first rotor is disposed at and substantially above the forward end of the fuselage and the second rotor is disposed at and essentially beneath the rear end of the fuselage,
said first rotor is tiltable about a first tilting axis extending substantially perpendicularly to the longitudinal axis of the fuselage out of the first tilted position downwardly and in front of the fuselage into the second tilted position, and
the second rotor is tiltable about a second tilting axis extending substantially perpendicularly to the longitudinal axis of the fuselage out of the first tilted position upwardly and behind the fuselage into the second tilted position.

2. The tiltrotor helicopter according to claim 1, wherein each of the first and second rotors includes a plurality of mechanical control elements.

3. The tiltrotor helicopter according to claim 1 or 2, wherein each of said first and second rotors have a first and second link means, respectively, and is tiltable about the first and second tilting axis, respectively, and controllable independently of the respective rotor tilted position in order to guarantee a linking of a respective swash plate in each rotor tilted position independently of this position.

4. The tiltrotor helicopter according to claim 3, link means of said first rotor is connected via control means with said second link means to be capable of operation in the same direction and in the opposite direction.

5. The tiltrotor helicopter according to claim 4, wherein said first and second rotors are connected with each other by means of a transmission and driven in each said tilted position.

6. The tiltrotor helicopter according to claim 5, wherein each of said first and second rotors has a rotor shaft, each of said rotor shafts being connected by means of a fork-shaped rotor mounting with bevel wheel gears to be capable of being tilted about the tilting axis.

7. The tiltrotor helicopter according to claim 6, wherein said control means includes one or more mixers which mix the control functions of the first and second rotors in dependence on the tilted position thereof.

8. The tiltrotor helicopter according to claim 7, wherein said control means further includes a trimming means to separately trim the control functions by means of the mixer in each said tilted position of each of said first and second rotors.

9. The tiltrotor helicopter according to claim 8, wherein said control means further includes an electrical, mechanical or hydraulic tilting means to tilt said first and second rotors.

10. The tiltrotor helicopter according to claim 9, wherein the fuselage includes a plurality of tail surfaces.

11. A method of controlling a tiltrotor helicopter comprising the steps of:
  providing a tiltrotor helicopter including:
    a fuselage,
    a wing arrangement
    at least one power plant, and
    first and second contrarotating, cyclically controllable rotors which are spaced from one another in the longitudinal direction of the fuselage and substantially arranged on a longitudinal axis of the fuselage as well as being respectively tiltable out of a first tilted position for helicopter flight into a second tilted position for airplane flight,
  said first rotor being disposed at and substantially above the forward end of the fuselage and the second rotor is disposed at and essentially beneath the rear end of the fuselage,
  said first rotor being tiltable about a first tilting axis extending substantially perpendicularly to the longitudinal axis of the fuselage out of the first tilted position downwardly and in front of the fuselage into the second tilted position, and
  the second rotor being tiltable about a second tilting axis extending substantially perpendicularly to the longitudinal axis of the fuselage out of the first tilted position upwardly and behind the fuselage into the second tilted position, and
  maintaining control of said first and second rotors during the transition phase from helicopter flight to airplane flight and in airplane flight.

12. The method of controlling a tiltrotor helicopter according to claim 11, wherein the step of maintaining control includes synchronous tilting of said first and second rotors in the transition phase.

* * * * *